United States Patent [19]

Kronmiller

[11] Patent Number: 5,129,179

[45] Date of Patent: Jul. 14, 1992

[54] TREE TRUNK HOLDING MEANS

[76] Inventor: Leroy M. Kronmiller, 7568 Ridge Ave., Philadelphia, Pa. 19128

[21] Appl. No.: 618,614

[22] Filed: Nov. 27, 1990

[51] Int. Cl.$^5$ ............................................. A01G 17/06
[52] U.S. Cl. ................................................ 47/42; 47/44
[58] Field of Search ........................................ 47/42, 44

[56] References Cited

U.S. PATENT DOCUMENTS

| | | | |
|---|---|---|---|
| 3,040,477 | 6/1961 | June | 47/42 |
| 4,318,246 | 3/1982 | Jungbluth et al. | 48/42 |
| 4,319,428 | 3/1982 | Fox | 47/42 |
| 4,635,418 | 1/1987 | Hobgood | 52/DIG. 13 |
| 4,649,666 | 3/1987 | Ness et al. | 47/44 |

FOREIGN PATENT DOCUMENTS

| | | | |
|---|---|---|---|
| 2393965 | 2/1979 | France | 47/44 |
| 63488 | 3/1913 | Switzerland | 47/42 |

*Primary Examiner*—Richard E. Chilcot, Jr.
*Assistant Examiner*—Joanne C. Downs
*Attorney, Agent, or Firm*—Frederick J. Olsson

[57] ABSTRACT

Device to hold a newly planted tree. Elongated flexible band is wrapped around the first of a pair of stakes and extends to and is wrapped around the tree trunk and then extends to and is wrapped around the second of the pair of stakes. Rings at each of the stakes and at the trunk permit the wound-around condition and a hook and loop self-gripping fastener secures the band of the second stake.

6 Claims, 1 Drawing Sheet

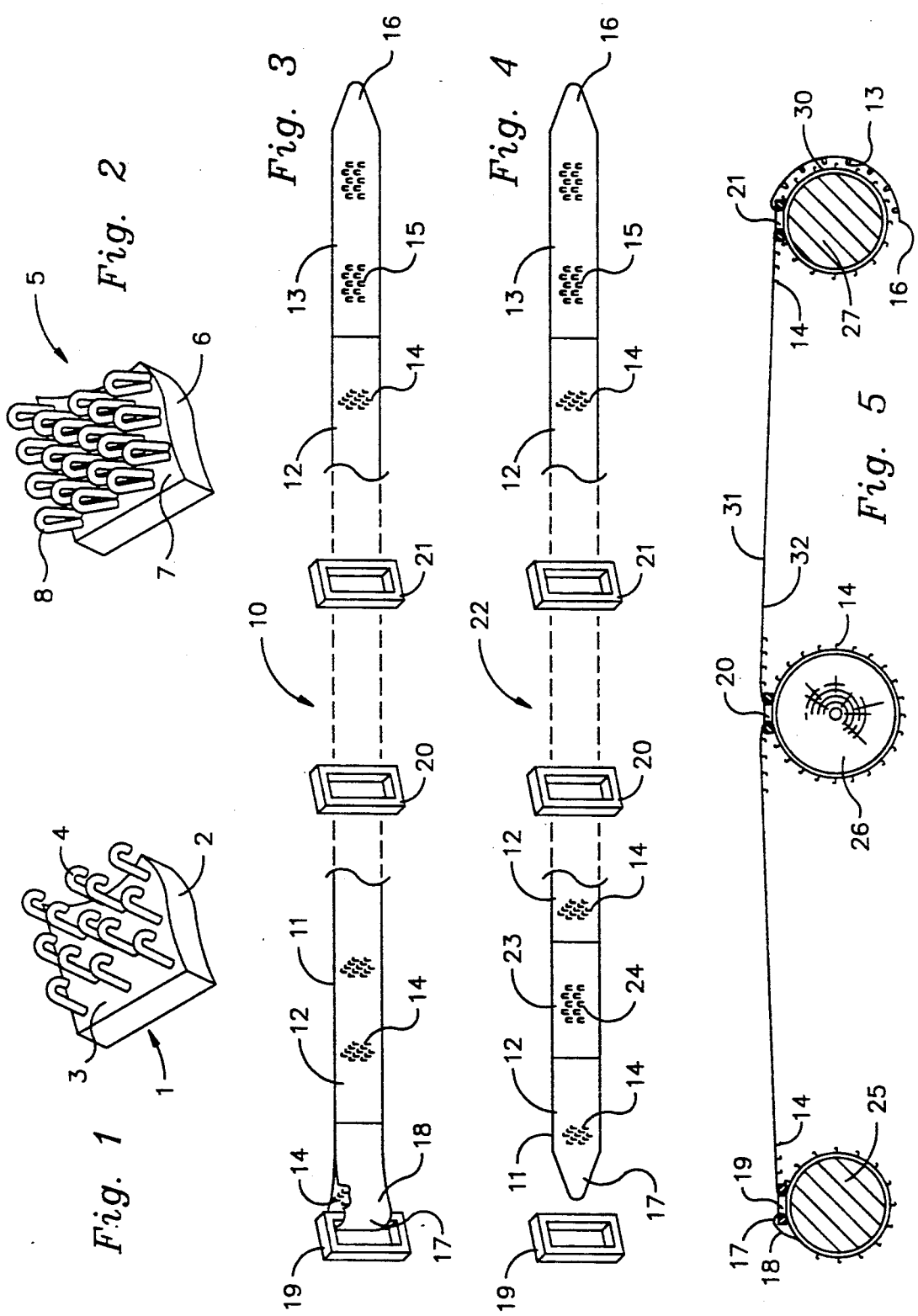

TREE TRUNK HOLDING MEANS

This invention relates to tree trunk supporting or holding means for supporting or holding newly planted trees during the initial growth thereof.

Most newly planted trees have root growth which is inadequate to provide for the tree to be naturally self-supporting. Therefore, such trees must rely on artificial assistance to hold them erect until the root structure develops and the soil settles around the root structure.

Various types of tree trunk holding or supporting means have long been employed to provide assistance of the kind referred to. Most of these require the use of two or more stakes spaced from the trunk of the tree and driven into the ground and having metal or non-metal means (or combinations of both) interconnecting the stakes and the tree trunk.

The present invention contemplates the use of at least one pair of stakes with tree trunk holding means comprising a flexible band interconnecting the tree trunk and the stakes by virtue of holding rings and self-gripping fastener means.

Among the advantages of the invention are very low cost, and astounding simplicity for: installing and removing without tools; adjustment for tree growth; quick removal when no longer needed; easily adapted to various trunk sizes; and capable of almost unlimited reuse.

The invention will be described below in connection with the following drawings wherein:

FIG. 1 is a perspective diagrammatic view to illustrate the hook section of self-gripping fastener means;

FIG. 2 is a perspective diagrammatic view to illustrate the loop section of self-gripping fastener means;

FIG. 3 is an exploded view of one form of tree trunk holding means;

FIG. 4 is an exploded view of the holding means of FIG. 1 with a modification; and FIG. 5 is a diagrammatic plan view illustrating the invention as interconnecting the trunk of a tree and a pair of stakes.

The preferred self-gripping fastener means employed in the invention is the hook and loop type in tape or band form, one tape having the hook section and the other tape having the loop section. Such tapes are sold under the trademark VELCRO by Velcro USA Inc. of Manchester N.H. and also under the trademark ZIP-A-GRIP by Singer Sewing Company of Edison, N.J.

Such fasteners are preferred since they can be manufactured from climate-resisting material, are flexible, resist direct pull but are easily peeled apart.

FIGS. 1 and 2 diagrammatically illustrate the use of the above referred to self-gripping fastener in the tree trunk holding means of the invention.

In FIG. 1 a hook section 1 has a base or strap 2 which is usually relatively stiff having a surface 3 from which project a plurality of hooks 4. In FIG. 2 a loop section 5 has a base or strip 6 which is usually relatively soft and has a surface 7 from which project the loops 8.

When the sections 1 and 5 are oriented face to face and pushed together the hooks 4 and loops 8 interengage. The hooks 4 have a flexibility which is sufficient to resist a direct pull of the section 1 away from the section 5 but which readily permits the two sections to be peeled apart.

Referring now to FIG. 3, a tree trunk holding means 10 includes a flat elongated band 11 fabricated from a climate resisting material made of Nylon. Preferably, the band 11 is fabricated so that hooks are formed on one surface throughout the length of the band except for a pair of loop sections as will be discussed. Thus, the band 11 has a hook section 12 and a loop section 13 adjacent the right hand end. The hooks are noted 14. The loops are noted by 15. For sake of illustration the loops are shown as small circles. The loop section 13 is considerably shorter in length than the band per se and can be fabricated with the loop section 12 or a short piece can be welded or sewn on the loop section. The loop section 13 extends inwardly from the free end 16 of the band. As will be noted from the description later on, it is important that the loop section be located on the same surface of the band as the hook section.

The opposite or left hand end 17 of the band 11 carries a starter loop 18. The starter loop is formed by turning back a short piece of the band and securing same by welding or sewing. Prior to forming the starter loop 18, a starter ring 19 is placed over the band so that the starter ring is captured by the loop.

In addition to the above mentioned components, the tree trunk holding means includes a trunk ring 20 and a stake ring 21 which are identical in construction to the starter ring 19.

In summary, the arrangement of FIG. 3 is provided as a kit which includes the band 11, the starter ring 19 fixed to the band 11 by pre-formed starter loop 18, and the trunk and stake rings 20 and 21.

The tree trunk holding means 22 of FIG. 4 is the same as the means 10 except that the starter loop is formed on the job rather than being preformed. In FIG. 4, the components have the same numbers as like components of FIG. 3.

In FIG. 4 a loop section 23 is welded or sewn on the band 11. The section 23 is spaced a short distance from the left hand end 17 of the band so that the hook section 12 is uncovered and the hooks 14 are exposed. The starter ring 19 is supplied loose (like the rings 20 and 21). To form a starter loop (like 17) the end of the band is threaded through the ring 19 and the hooks 12 brought into engagement with the loops 24.

In summary, the arrangement of FIG. 4 is supplied as a kit including the band 11 (with loop section 24) and the rings 19, 20, 21.

The manner in which the tree trunk holding means 10 and 22 are employed will be described in connection with FIG. 5. In FIG. 5 the tree trunk is indicated at 25 and the stakes at 26 and 27.

First, assume that the starter loop is preformed (like 17) or formed on the job and as in FIG. 4.

The starter loop 18 and starter ring 19 are held adjacent the stake 25 and the band 11 wound around the stake and the free end 16 threaded through the ring 19. The band then can be pulled tight around stake 25 (moved to the right in FIG. 5). The trunk ring 20 is positioned adjacent the trunk 26 and the free end 16 of the band is threaded through the ring 20 and moved around the trunk 26 and then pushed out through the ring 20. The band is again pulled tight (moved to the right as seen in FIG. 5). Next, the stake ring 21 is positioned near the stake 27 and the free end 16 threaded through the ring 21 and moved around the stake and brought out through the ring 21. The band is pulled taught so that the band is firmly wound around the stake 25, the trunk 26 and the stake 27. The free end 16 and remaining part of the band are wound around the part 30 of the band (which has the hooks 14 extending outwardly) so that the loop section 13 is in juxta position with part 30 and the hooks and loops made to engage.

From the foregoing it will be readily apparent that the holding means can be readily removed and adjusted to accommodate increased diameter of the trunk 26. Removal is accomplished by following the reverse procedure. The holding means can be used over and over again.

The above described bands are preferably one inch in width and approximately 70" long. With these bands, the stakes 25 and 27 are driven into the ground each at an appropriate distance from the trunk. Such a band will accommodate 1" CAL to 4" CAL trees.

In some instances, it may be advantageous to use a pair of holding means, one for each stake. In such cases, the band is approximately 48" in length and the free end terminates at the point 31 (FIG. 5) with a loop section located adjacent the free end 31 in the area indicated at 32. The band is placed on the stake 25 and around the trunk 26 as previously described. After the band is wrapped around the trunk 26 and threaded through the trunk ring 20, the band is moved down back over itself so that the loops on section 32 engage the hooks on the band. The other identical holding means is connected between the stake 27 and trunk 26 in a manner similar to that described above.

I claim:

1. For use in supporting a tree which is substantially not self-supporting, tree trunk holding means to be interconnected between the trunk of the tree and a pair of stakes driven into the ground comprising:
   a flat, elongated band made of flexible material;
   a starter loop formed on one end of said band;
   a first holding ring mounted on said starter loop by that the starter loop extends through the ring;
   hook and loop self-gripping fastener means adjacent the opposite end of said band, the self-gripping fastener means comprising a hook section and a loop section disposed adjacent one another on one surface of the band;
   second and third holding rings to be placed on said band by that the band extends through the rings; and
   the interior of each said holding ring having at least two substantially flat opposing surfaces engagable by said band when the band extends through the ring.

2. The tree trunk holding means according to claim 1 wherein said starter loop is formed by hook and loop self-gripping fastener means comprising a hook section and a loop section each disposed on one surface of the band.

3. For use in supporting a tree which is substantially not self-supporting, tree trunk holding means to be interconnected between the trunk of the tree and a pair of stakes driven into the ground:
   a flat, elongated band made of flexible material;
   first hook and loop self-gripping fastener means adjacent one end of said band, the self-gripping fastener means comprising a hook section and a loop section disposed adjacent one another on one surface of the band;
   a first holding ring to be placed on said one end of said band with the band extending through the holding ring to provide for the hook and loop sections to be joined to form a loop whereby the first ring is mounted in the loop;
   second hook and loop self-gripping fastener means adjacent the opposite end of said band, the self-gripping fastener means comprising a hook section and a loop section disposed adjacent one another on one surface of the band;
   second and third holding rings to be placed on said band by that the band extends through the ring; and the interior of each said holding ring having at least two substantially flat opposing surfaces engagable by said band when the band extends through the ring.

4. In combination:
   a tree which is substantially not self-supporting;
   first and second stakes driven into the ground on opposite sides of the tree;
   a flat, elongated band;
   a starter loop on one end of said band and mounting a starter ring, the starter loop and starter ring being disposed closely adjacent said first stake and the band being wrapped around the first stake and extending through said starter ring and thence toward the trunk of said tree;
   self-gripping fastener means disposed adjacent the opposite end of said band, the fastener means comprising a hook section and a loop section adjacent one another on one surface of the band;
   a trunk ring disposed closely adjacent said trunk, said band extending through the trunk ring, around said trunk, through the trunk ring and thence toward said second stake;
   a stake ring closely adjacent said second stake, said band extending through the stake ring, around said second stake, through the stake ring, and then back over the portion of the band wound around the second stake, and
   engaging the same whereby the loop and hook section and the loop of said loop section interengage; and
   the interiors of said starter ring, said trunk ring, and said stake ring each having at least two substantially flat opposing surfaces engaged by said band.

5. The combination according to claim 4 wherein said starter loop is formed by hook and loop self-gripping fastener means comprising a hook section disposed on one surface of the band and a loop section disposed on the same surface of the band.

6. For use in supporting a tree which is substantially not self-supporting, tree trunk holding means to be interconnected between the trunk of the tree and a pair of stakes driven into the ground comprising:
   a flat, elongated band made of flexible material;
   a starter loop formed on one end of said band;
   a first holding ring mounted on said starter loop by that the starter loop extends through the ring;
   hook and loop self-gripping fastener means adjacent the opposite end of said band, the self-gripping fastener means comprising a hook section and a loop section disposed adjacent one another on one surface of the band and
   the interior of said first holding ring having at least two substantially flat opposing surfaces engagable by said band.

* * * * *